(«12») United States Patent
Schulze

(10) Patent No.: US 8,555,679 B2
(45) Date of Patent: Oct. 15, 2013

(54) MULTIPLE-ACTION ADDITION VALVE FOR A SYSTEM FOR METERING LIQUID OR PASTY WASHING AIDS AND METHOD FOR OPERATING THE MULTIPLE-ACTION ADDITION VALVE

(75) Inventor: Ingo Schulze, Panketal (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 854 days.

(21) Appl. No.: 12/672,721

(22) PCT Filed: Aug. 5, 2008

(86) PCT No.: PCT/EP2008/060263
§ 371 (c)(1),
(2), (4) Date: Feb. 9, 2010

(87) PCT Pub. No.: WO2009/021872
PCT Pub. Date: Feb. 19, 2009

(65) Prior Publication Data
US 2011/0154864 A1    Jun. 30, 2011

(30) Foreign Application Priority Data
Aug. 10, 2007   (DE) .......................... 10 2007 037 883

(51) Int. Cl.
*D06F 29/00* (2006.01)

(52) U.S. Cl.
USPC ........... 68/17 R; 68/12.01; 68/200; 134/56 R; 134/94.1; 134/61

(58) Field of Classification Search
USPC ...... 68/12.01, 12.18, 17 R, 17 A, 200; 8/147, 8/158; 134/18, 26, 24, 56 R, 58 R, 60, 61, 134/94.1, 98.1, 99.1, 114, 166 R, 172, 184, 134/198
See application file for complete search history.

(56) References Cited

U.S. PATENT DOCUMENTS

| 4,103,520 | A | * | 8/1978 | Jarvis et al. ................. 68/12.18 |
| 4,310,022 | A | * | 1/1982 | Cohen ....................... 137/624.18 |
| 4,420,951 | A | * | 12/1983 | Clearman et al. ............. 68/17 R |
| 6,098,646 | A | * | 8/2000 | Hennemann et al. .... 137/101.19 |
| 6,367,504 | B1 | | 4/2002 | Knapp |

FOREIGN PATENT DOCUMENTS

| DE | 2722363 A1 | 12/1977 |
| DE | 3913838 A1 | 10/1990 |
| DE | 102007032759 A1 | 1/2009 |

\* cited by examiner

*Primary Examiner* — Eric Golightly
*Assistant Examiner* — Thomas Bucci
(74) *Attorney, Agent, or Firm* — James E. Howard; Andre Pallapies

(57) ABSTRACT

A washing machine includes a valve with a housing base and a rotor, the housing base defining a central liquid line, nozzles in the housing base and in a circle that is concentric to an axis of the rotor, the nozzles being connectable to the central liquid line by a connection line in the rotor and having a seal that seals a connection with the connection line, a motor for driving the rotor, a storage container connected to each of the nozzles, a liquid line connected to the central liquid line, a pump connecting the liquid line to a dispensing device for a laundry treatment room, and a water feed without a seal in a transition to the connection line. The rotor axially presses the seals toward the housing base until contact areas of the rotor and the housing base oppose each other and are close to each other.

13 Claims, 4 Drawing Sheets

MULTIPLE-ACTION ADDITION VALVE FOR A SYSTEM FOR METERING LIQUID OR PASTY WASHING AIDS AND METHOD FOR OPERATING THE MULTIPLE-ACTION ADDITION VALVE

BACKGROUND OF THE INVENTION

The invention relates to a multiple-action addition valve for a system for mechanically metering liquid or pasty washing aids, which are stored in storage containers, into automatically controlled washing machines comprising a central liquid line arranged in a housing base and a plurality of nozzles which are arranged in a circle which runs concentrically to the axis of a rotor, in the housing base, said nozzles being individually connectable to the outlet by a connection line within the motor-driven rotor and comprising a seal for the connection to the connection line. The invention also relates to a method for operating such a multiple-action addition valve.

DE 197 36 982 A1 discloses a multiple-action addition valve for adding use dilutions, which have been produced from liquid or pasty concentrated washing aids, which are stored in storage containers, and a diluting liquid, preferably water. This multiple-action addition valve is considered for use in commercial washing machines in order to provide several machines with already premixed doses of use dilutions via the liquid line from a central dispensing device for washing aids. To this end, the individual doses of stored washing aid concentrates are diluted using water and are then delivered to a multiple-action addition valve known as a "multiple opening valve". From there they are distributed as a use dilution via the nozzles to a plurality of washing machines.

The known multiple-action addition valve is, in addition to its different application area, also complicated and expensive. In particular, an expensive mechanism exists, by means of which the nozzles arranged in the housing base are then always separated hydraulically from the connection line arranged in the rotor before the rotor is to rotate into a new position. To this end, a conical part of the connection line is lifted out of a funnel of the nozzle and simultaneously releases the circumferential ring seal. After moving into the new position, the rotor has to be lowered again so that the conical part lowers into the funnel of the other nozzle and loads this seal. A compressed air cylinder, which engages with the drive shaft of the rotor, is used to raise and lower the rotor.

BRIEF SUMMARY OF THE INVENTION

The object underlying the invention is to render a multiple-action addition valve of the type described in the introduction serviceable for washing machines which are used in households and with which, a concentrate of washing aids is to be conveyed from several storage containers into a mixing chamber, where it is to be diluted and mixed (preferably) with water and subsequently guided into the laundry treatment chamber of this one washing machine. A further essential object of the invention is that such a multiple-action addition valve is to be designed extremely cost-effectively due to its use in a product within the consumer goods industry, but must however function in a stable and reliable manner with a normal load over a service life of at least 10 years. It is therefore important in the case of known multiple opening valves to seal the different liquid lines in respect of one another, nevertheless the outlay involved must not be too high.

In accordance with the invention, this object is achieved in such a way that the multiple-action addition valve is used to add selected liquid or pasty washing aids, that each of the nozzles connects to one of the storage containers and the liquid line can be connected to a dispensing device for a laundry treatment chamber via a pump, that the rotor, on account of a force which permanently acts on it axially in the direction of the housing base, presses the seals until the contact areas of the rotor and of the housing base are opposite and substantially as close as possible, and that a feed of rinsing liquid, preferably water is provided, and has no seal in the transition to the connection line. It is herewith possible on the one hand to dispense with a complicated device for releasing the nozzle and connection line transitions. On the other hand, the multiple-action addition valve is suited to selecting one of several washing aids for a washing machine as a result of the described arrangement. The close opposite positioning of the rotor and the housing base reduce their distance to a very minimal distance of almost zero and in this way already form a good seal between the individual nozzle transitions. As a force which permanently acts on the rotor, e.g. a spring force, also has limits, seals which include the transitions are still provided.

A system for mechanically metering several different washing aids must generally be cleaned. A feed of rinsing water after or prior to each metering process is therefore also used for effective cleaning of the surfaces which are potentially wet by the washing aids so that mutual influences or impairments of the washing aid with one another need not be taken into account during operation. To this end, other systems are also known, which rinse the lines of the system after or prior to each metering process (DE 10 2007 032 759.7 of the present patent applicant). In one possible development of the inventive multiple-action addition valve, one of the nozzles can be provided for the feed of rinsing liquid, preferably water, and can have no seal to the connection line. In the event of its activation, the nozzle can namely convey rinsing water into the dispensing system, in order to prevent unwanted mixtures between the subsequently metered washing aid and the remainder of the previously metered washing aid. The missing seal may now also allow water to reach between the two surfaces of the rotor and the housing base during the rinsing process and to dilute and rinse the residues of washing aids which have accumulated there.

The force between the rotor and the housing base can be shown by a centrally arranged pressure spring between a housing cover of the multiple-action addition valve and the upper rotor surface. As a result, this force could have been set by assessing the helical compression spring. Provided, in accordance with a further embodiment of the invention, the force is shown by an accurately fitting positioning of the rotor in the housing base, this positioning can effect a permanent adjustment of the force such that the positioning can be adjusted. For instance, the housing cover can be height-adjusted by means of a thread and locked into this position.

The seals consist for instance of a highly flexible material with a minimal Shore hardness of approximately 30 to approximately 40 Shore hardness units, so that less tolerances in terms of height position can therefore be balanced out by means of the flexibility of the seals.

The rinsing reliability can be improved in particular by a development of the inventive multiple-action addition valve, by the feed being arranged as far as possible from the outlet of the central line. An advantageous possibility of a very remotely distanced arrangement consists in the feed leading across the surface of the rotor which lies opposite to the housing base and the rotor being introducible into a rotary position, in which the opening of the connection line which passes through the circle is between two nozzles which are provided for the liquid or pasty washing aid. If the pump is active at the same time, the rinsing liquid is pulled/pushed intensively between the mutually facing surfaces of the rotor and the housing base and any washing aid residues are washed away. The feed can be shown here by a further nozzle, which is arranged in a housing cover positioned above the rotor.

On the other hand, the top side of the rotor can also be freely accessible in the inflow area of the rinsing liquid. The fresh water supply of the washing machine is best suited hereto.

The invention can be shown best by means of a procedure, in which, during the rinsing process, in which the rotor is moved into a rotary position for the rinsing position and the rinsing liquid is conveyed from the feed through the connection line to the central liquid line, the rotor is moved in the rotary position by a few angular degrees. As a result, the mutually facing surfaces of the rotor and of the housing base move opposite to one another and release adhesions in their intermediate space, which were formed by washing aid residues. To this end, the rotor is particularly advantageously moved in the rotary position with alternating rotary directions, at best even with a pulsating movement. This method allows washing aid residues to be washed away very quickly.

BRIEF DESCRIPTION OF THE DRAWINGS

The invention is described in more detail below with reference to exemplary embodiments shown in the drawing, in which.

DETAILED DESCRIPTION OF EXEMPLARY EMBODIMENTS OF THE PRESENT INVENTION

Figure 1:
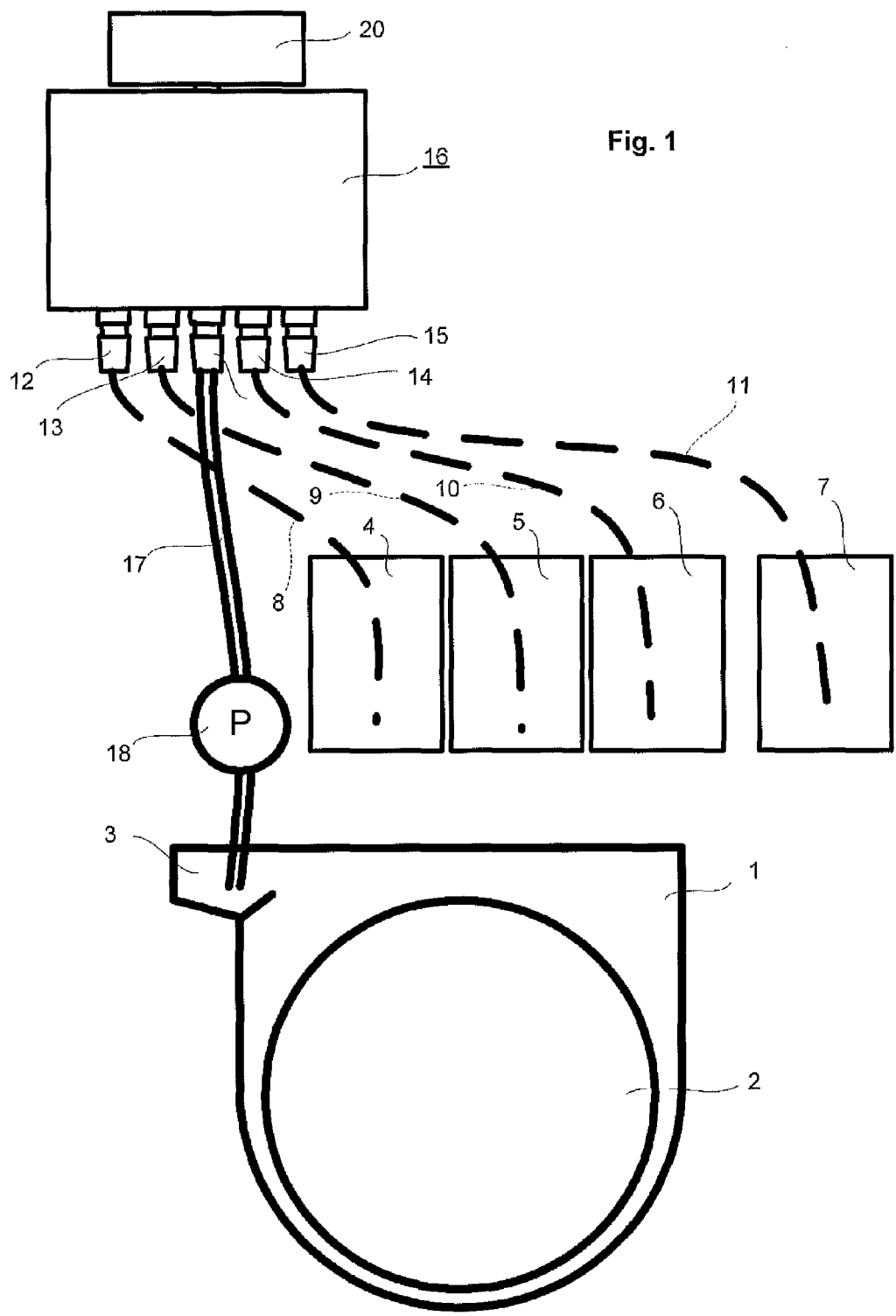
FIG. 1 shows a schematic representation of a system for mechanically metering liquid washing aids which are stored in storage containers into a washing machine.

The system shown in FIG. 1 for mechanical metering is shown here opposite the washing machine, from which only the tub 1, and the laundry drum 2 mounted rotatably therein and a device 3 for adding washing aids are shown schematically, very enlarged, so that its structure can be seen clearly. This device 3 is generally used to provide manually metered powder or liquid washing aid portions in order to rinse using fresh water out of a fresh water line (not shown). Storage containers 4 to 6 are arranged in this metering system, which are used to store large quantities of different washing aids. An additional storage container 7 is used in this example to store a sufficiently large quantity of fresh water, with which the lines, which are wet with a concentrated washing aid, can be freely rinsed in a phase, in which no washing aid is added.

Each storage container 4 to 7 is connected via its own intake line 8 to 11 to a nozzle 12 to 15 of a multiple-action addition valve 16 in each instance, which feeds the dose from one of the storage containers 4 to 7 via a liquid line 17, a suction pump 18 and the washing aid rinsing device 3 to the tub 1. A positionable connection line exists in the multiple-action addition valve 16, as is shown in more detail below, said connection line being connectable to the central nozzle 19 of the liquid line 17 by means of one optional nozzle 12 to 15. To this end, a drive motor 20 having a device known per se and being mounted on the top side of the multiple-action addition valve 16 is used for position determination purposes. A control device (not shown) has information which controls the drive motor in accordance with the desired washing aid. The respective intake line, e.g. 8 of the container 4 is then connected to the nozzle 19 in the liquid line 17, in order to pump out a corresponding dose of the relevant washing aid using the pump 18 during a duration measured by the control device and convey it into the tub 1.

After each delivery of a washing aid, the whole conduit strand from the connection line, via the central nozzle 19, the liquid line 17 to the pump 18, can be rinsed with clear water. In the example shown, the water is stored in the container 7 and is pumped to the pump 18 for the purpose of rinsing via the intake line 11, the connection line of the multiple-action addition valve 16 and the central nozzle 19. During this water delivery, all participating conduits are rinsed and the dilutions are conveyed to the tub 1. As the control device knows which of the stored washing aids do not tolerate one another, a rinsing process must be carried out after each metering of any washing aid. Rinsing after metering a washing aid, which does not tolerate the subsequently metered washing aid, is sufficient, if the effect of the subsequently metered aid is negatively affected or both aids react to one another and the reaction product is in any way harmful. In any case, such rinsing processes increase the service life of an inventive multiple-action addition valve 16.

Figure 2:
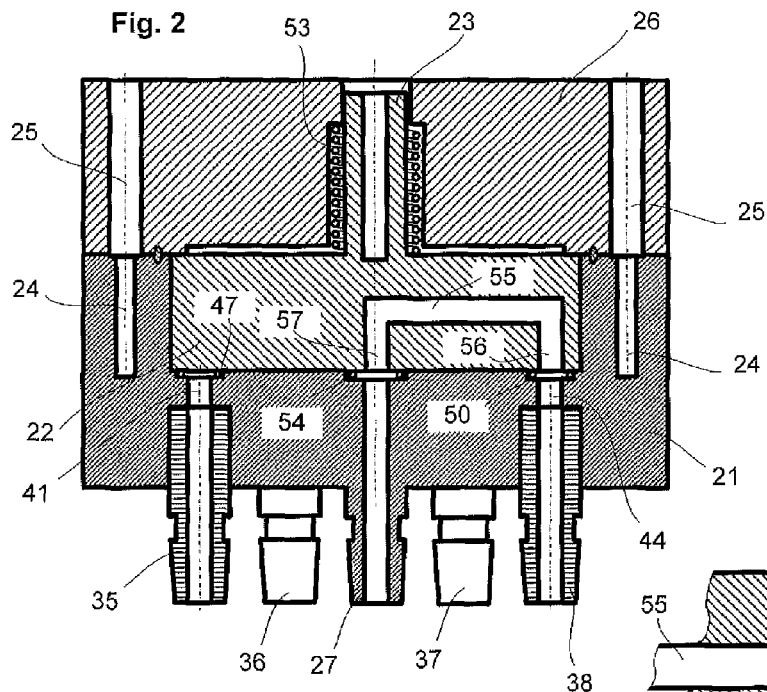
FIG. 2 shows an inventively designed multiple-action addition valve in a vertical section along the line of intersection II-II in FIG. 4
Figure 3:
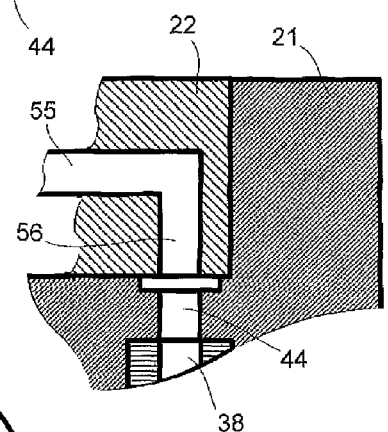
FIG. 3 shows an enlarged detailed view of the section according to the detail III in FIG. 2 for a variant with rinsing of the contact areas.
Figure 4:
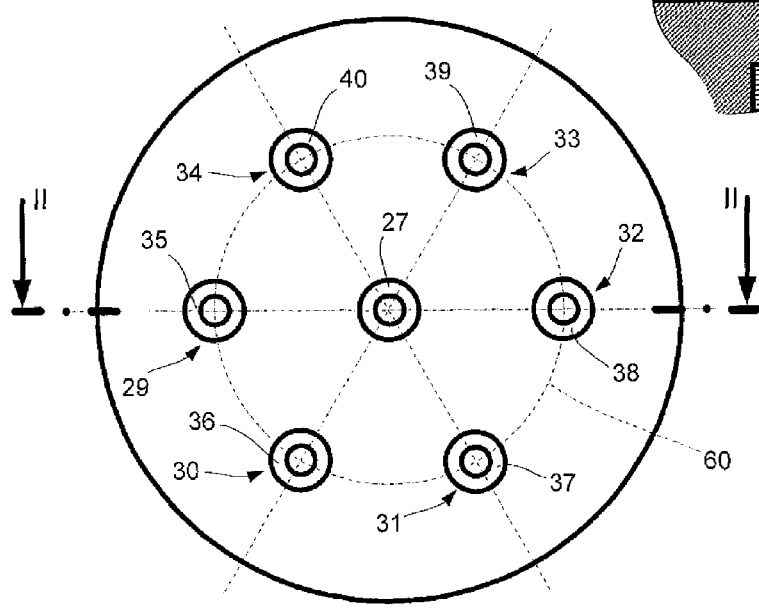
FIG. 4 shows a view of the underside of the housing base with the centrally arranged nozzles distributed on a circular path.

An example of such a multiple-action addition valve 16 can be seen in FIGS. 2 to 4. It essentially consists of a housing base 21 with a well fitting cavity for the rotor 22, which has a drive shaft 23 on its top side. The motor 20 is coupled to this shaft 23. Bores 24 in the housing base 21 and 25 in the housing cover, which supports the shaft 23, are used to fix the screws on the same axis.

One central nozzle 27 and six nozzles 29 to 34 arranged on a concentric circle 28 are attached to the housing base 21. While the central nozzle 27 is an integrated component of the housing base 21, the nozzles 29 to 34 each consist of one insert 35 to 40, which are distributed at the same distance from the central nozzle 27 and from adjacent nozzles in each instance. They are embodied such that the lines 8 to 11 and 17 consist or tubes and can be easily moved onto one another without having to redetach.

The openings of the nozzles 27 and/or the channels 41 to 46 assigned to the inserts 35 to 40 are provided with sealing ring housings, into which the seals 47 to 52 are placed. These seals consist of a highly elastic material with a minimal Shore hardness of approximately 30 to approximately 40 Shore hardness units and are thus dimensioned so that they protrude out of the sealing ring housing when in a relaxed state. It is only after inserting the rotor 22 that the underside presses, assisted by a central helical compression spring 53, the sealing rings 47 to 52 so strongly together that the flat surfaces of the underside of the rotor 22 and the top side of the rotor cavity in the housing base 21 face one another with as minimal a distance as possible, so that they allow a minimal gap therebetween. The same applies to the sealing ring 54 of the central nozzle 27. A connection line 55 fixedly cast in the rotor 22 is used for the liquid connection of each nozzle 29 to 34 with the central nozzle 27 in the respective rotary position of the rotor 22. Its opening 56 has, according to the rotary position of the rotor 22, a connection with one of the openings 41 to 46 of the nozzles 29 to 34 arranged in a distributed fashion on the circle and its opening 57 has a constant connection to the central nozzle 27. In the rotary position shown, the connection line 55 connects the central nozzle 27 to the outer nozzle 32 (insert 38) so that during operation the pump 18 draws a dosage of rinsing water out of the storage container 7.

In the variant shown in FIG. 3, the sealing ring 50 is missing in the channel 44 of the nozzle 32, into which the insert 38 is pulled. This nozzle is connected to the intake line 11, which is used to pump rinsing water from the container 7. If the channel 44 therefore conveys rinsing water, the missing seal can provide for possible wettings of the contact areas between the housing base 21 and rotor 22 to be rinsed by washing aids, therewith reducing or eliminating the risk or reactions to other washing aids. Such a free rinsing can be particularly favorable if a compression principle is used instead of the suction principle shown here, whereby pressure prevails in the intake line 11 and then also in the channel 44, said pressure forcing rinsing liquid to enter between the contact areas.

Figure 5:
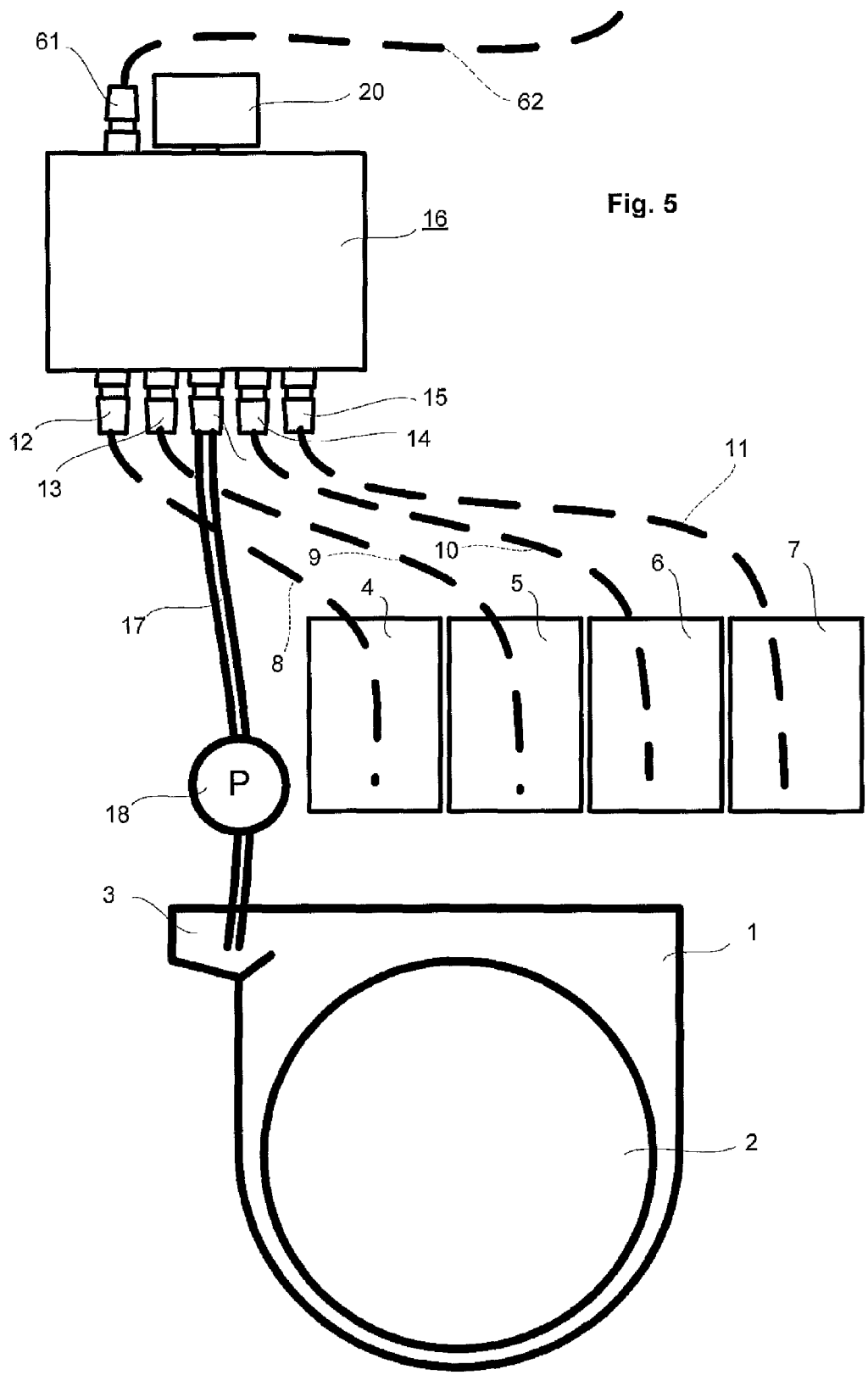
FIG. 5 shows a schematic representation of an alternatively embodied system for mechanically metering liquid washing aids stored in storage containers into a washing machine.

With the system shown in FIG. 5, the storage containers 4 to 7 are invariably provided for the storage of washing aids. The line 11 is then naturally not a rinsing line but instead, like the lines 8 to 10, a line for feeding the respective washing aid out of the storage container 7. To realize a rinsing device, a nozzle 16 is attached to the top part of the multi-action addition valve 16, to which a rinsing line 62 is guided. On the entry side, the rinsing line 62 can be connected to any source, which conveys rinsing liquid. This can either be, as in the example in FIG. 1, a storage container or the tub 1, if it is to be rinsed with solution or the fresh water supply of the washing machine (not shown) if it is to be rinsed with inflowing fresh water.

Figure 6:
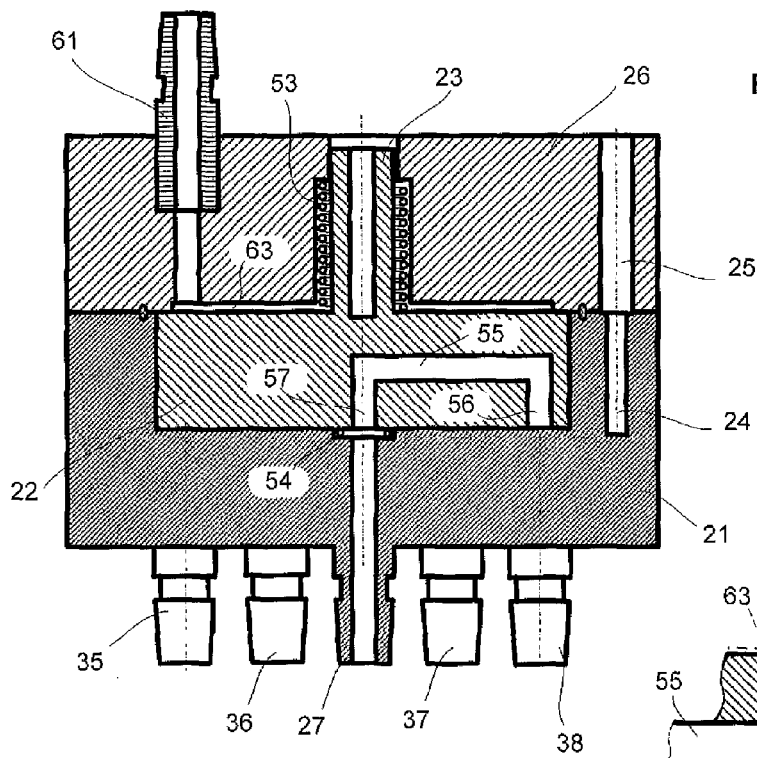
FIG. 6 shows an inventively designed multiple-action addition valve for an alternatively embodied system according to FIG. 5 in the vertical section along the line of intersection VI-VI in FIG. 8
Figure 8:
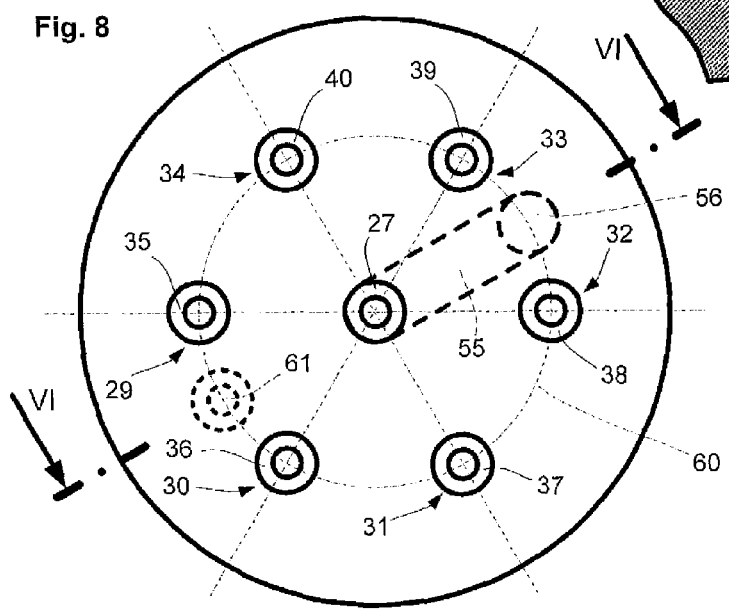
FIG. 8 shows a view of the underside of the housing base of the alternative multiple-action addition valve according to FIG. 6 with the centrally arranged nozzles distributed on a circular path and with a nozzle for feeding rinsing liquid, which is arranged in the housing cover.

The multiple-action addition valve 16 in FIG. 6 has a similar design to that in FIG. 2. With the representation in FIG. 6, it should only be noted that the cut surface is produced from an oblique line of intersection VI-VI in FIG. 8 so that the sides of the nozzles 35 and 38 cannot be seen cut out, as in FIG. 2. Instead, the nozzle 61 mounted in the housing cover 26 backs onto the cut surface. It is apparent that rinsing liquid fed there can reach the intermediate space 63 between the housing cover 26 and the rotor 22 and from there in all gaps 64 surrounding the rotor between its surface and those of the surrounding body, as well as the housing base 21. The rinsing liquid in this way also reaches the residues of washing aids stored in the gap 64, which are received together with the rinsing water by the opening 56 of the connection line 55 and are guided via the nozzle and the pump 18 into the tub. As apparent from FIG. 8, the rotor 22 has a position, in which the connection line 55 does not align its opening 56 to one of the nozzles 29 to 34 for the washing aid but instead to a room between two nozzles, here between the two nozzles 32 and 33. This enables the nozzles 61 and the opening 56 to be kept as far apart from one another as possible if the gap 64 between the rotor 22 and the housing base 21 is to be rinsed free of washing aid residues, so that the rinsing aid passes through all gap regions as far as possible.

Figure 7:
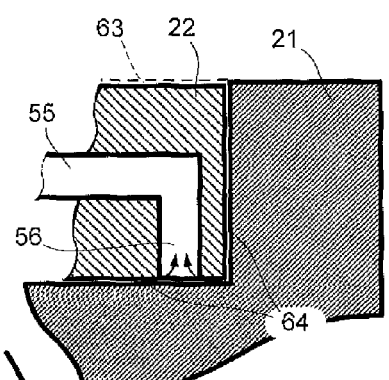
FIG. 7 shows an enlarged detailed view of the section according to the detail VII in FIG. 6 for a variant with rinsing of the contact areas with rinsing liquid, which is pumped out of the region of the contact area gap.

FIG. 7 still shows the gap 64 as intermediate spaces between the surfaces of the rotor 22 and the surfaces of the housing base 21 surrounding it. The arched arrows in the opening 56 of the connection line 55 also indicate how the rinsing liquid (together with the washing aid residues) is pumped out of the gap 64 into the connection line 55 and is thus transported via the central nozzle 27 to the tub 1.

The invention is not restricted to the exemplary embodiment shown. The suction nozzles 29 to 34 can also be arranged in a distributed fashion on a conical area or on the lateral area of the housing base 21. The rotor 22 must be adapted accordingly. More or less nozzles can also be distributed on the circle and the distribution need not necessarily be uniform; since a drive motor 20 could also indicate any position to the rotor 22, within certain limits. Instead of the drive motor, any other type of drive means generating circular movements can also be used. The shape of the seals is also not defined, just as little as the type and shape of the spring 53, which presses the rotor 22 against the housing base 21. For instance, latching elements of the housing cover 26 or of the housing base 21 which are injection molded from plastic and engage with one another could also convey a comparable spring effect with such a rotor 22. A screwing of the housing cover 26 to the housing base 21 could also enable the contact force to be adjusted. To rinse the conduit paths, water need not necessarily be stored in the storage device, if it is possible to ensure that freshwater is available from the conduit network or a comparatively diluted solution from the tub 1 at the time when rinsing is required. Only conduit 11 need then be connected to the corresponding source.

The invention claimed is:

1. An automatically controlled washing machine with a system for mechanically metering liquid or pasty washing aids stored in storage containers, the system comprising:
    a multiple-action addition valve with a housing base and a rotor, the housing base defining a central liquid line;
    a plurality of nozzles in the housing base and in a circle that is concentric to an axis of the rotor, the nozzles being connectable to the central liquid line by a connection line in the rotor and having a seal that seals a connection with the connection line;
    a motor for driving the rotor;
    a storage container connected to each of the nozzles;
    a liquid line connected to the central liquid line;
    a pump connecting the liquid line to a dispensing device for a laundry treatment room, wherein the rotor axially presses the seals toward the housing base until contact areas of the rotor and the housing base oppose each other and are close to each other; and a water feed without a seal in a transition to the connection line.

2. The washing machine of claim 1, further comprising a helical compression spring between a housing cover and an upper surface of the rotor that presses the seals toward the housing base until contact areas of the rotor and the housing base oppose each other and are close to each other.

3. The washing machine of claim 1, wherein the rotor is accurately fitted and positioned in the housing base to press the seals toward the housing base until contact areas of the rotor and the housing base oppose each other and are close to each other.

4. The washing machine of claim 1, further comprising a housing cover accurately fitted by a screw fitting to the housing base with a defined distance between the housing cover and the housing base such that the rotor axially presses the seals toward the housing base until contact areas of the rotor and the housing base oppose each other and are close to each other.

5. The washing machine of claim 1, wherein the seals comprise a highly flexible material with a minimal Shore hardness of approximately 30 to 40 Shore hardness units.

6. The washing machine of claim 1, wherein the water feed is arranged as far away from the axis of the rotor as possible while still within an outer circumference of the rotor.

7. The washing machine of claim 6, wherein the water feed is connected across an area of the rotor facing the housing base to the connection line and the rotor is positionable to a position at which an end of the connection line is between two of the plurality of nozzles.

8. The washing machine of claim 7, wherein the feed comprises a further nozzle in a housing cover positioned above the rotor.

9. The washing machine of claim 1, wherein a topside of the rotor is freely accessible in an inflow region of the water feed.

10. The washing machine of claim 9, wherein the water feed comprises a free water supply into the washing machine.

11. A method for rinsing a multiple action addition valve in an automatically controlled washing machine with a system for mechanically metering liquid or pasty washing aids which are stored in storage containers, the system having a multiple action addition valve which has a central liquid line in a housing base and a plurality of nozzles in a circle which runs concentrically to an axis of a motor-driven rotor, in the housing base, the nozzles being individually connectable to an outlet by a connection line within the motor-driven rotor and having a seal for the connection with the connection line, each of the nozzles connected to one of the storage containers and the liquid line connected via a pump to an addition device for a laundry treatment room the rotor pressing the seals by means of a permanent force acting axially thereupon in the direction of the housing base, until contact areas of the rotor and the housing base are opposite and substantially as close as possible, and a feed of water that has no seal in a transition to the connection line, the method comprising:

moving the rotor a few angular degrees into a rotary position that connects the central liquid line to the feed of water via the connection line during a rinsing process.

12. The method of claim 11, wherein the moving of the rotor comprises moving the rotor with alternating rotary directions.

13. The method of claim 12, wherein the moving of the rotor comprises moving the rotor in a pulsating fashion.

* * * * *